United States Patent [19]

Yorita

[11] Patent Number: 4,585,913
[45] Date of Patent: Apr. 29, 1986

[54] BELLOWS DEVICE

[75] Inventor: Mitsumasa Yorita, Itami, Japan

[73] Assignee: Mitsubishi Denki Kabushiki Kaisha, Tokyo, Japan

[21] Appl. No.: 640,324

[22] Filed: Aug. 13, 1984

[30] Foreign Application Priority Data

Sep. 17, 1983 [JP] Japan .................. 58-171585

[51] Int. Cl.⁴ .................. H01H 33/66; F16L 11/00; F16L 21/00
[52] U.S. Cl. .................. 200/144 B; 200/83 B; 138/121; 138/122; 285/226
[58] Field of Search .......... 200/144 B, 83 B, 83 C, 200/83 D; 138/121, 122; 285/226, 227, 228, 229

[56] References Cited

U.S. PATENT DOCUMENTS

| | | | |
|---|---|---|---|
| 2,366,897 | 1/1945 | Grooms | 200/83 C |
| 2,702,996 | 3/1955 | Davis | 64/32 |
| 2,753,415 | 7/1956 | Andresen, Jr. | 200/83 C |
| 2,847,035 | 8/1958 | Peters | 285/227 |
| 3,166,658 | 1/1965 | Jennings | 200/144 B |
| 3,620,557 | 11/1971 | Sturn | 285/228 |
| 4,079,217 | 3/1978 | Oeschger | 200/144 B |
| 4,283,078 | 8/1981 | Ross et al. | 285/229 |
| 4,295,496 | 10/1981 | Bixby | 138/122 |
| 4,484,772 | 11/1984 | Ross, Sr. et al. | 285/226 |
| 4,508,373 | 4/1985 | Ward | 285/226 |

FOREIGN PATENT DOCUMENTS

| | | | |
|---|---|---|---|
| 1142257 | 7/1963 | Fed. Rep. of Germany . | |
| 448646 | 4/1968 | Switzerland . | |
| 812723 | 4/1959 | United Kingdom | 200/83 D |
| 1056660 | 1/1967 | United Kingdom . | |

Primary Examiner—Robert S. Macon
Attorney, Agent, or Firm—Oblon, Fisher, Spivak, McClelland & Maier

[57] ABSTRACT

A bellows device having a plurality of recesses and ridges in the direction of expansion and contraction is used for a movable part of a vacuum switch tube. The thickness of a middle part in the direction of expansion and contraction is 1.2 times or more than the thickness of a part placed adjacent the middle part. The middle part has three or more ridges.

6 Claims, 12 Drawing Figures

BELLOWS DEVICE

BACKGROUND OF THE INVENTION

1. Field of the Invention

The present invention relates to a bellows device having a plurality of recesses and ridges in the direction of expansion and contraction. More particularly, it relates to such a bellows device used for a pressure container such as a vacuum switch tube to operate depending on pressure difference between the interior and exterior of the pressure container.

2. Discussion of the Background

Figure 1:
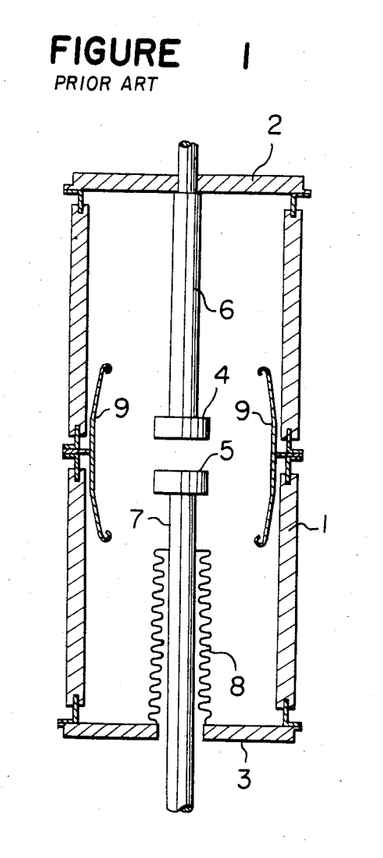
FIG. 1 is a cross-sectional view of a conventional vacuum switch tube with a bellows.

In general, a vacuum switch tube is so constructed as shown in FIG. 1 that openings formed at both sides of a pressure container 1 of an insulating material are closed by a stationary end plate 2 and a movable end plate 3; the interior of the thus closed pressure container is evacuated to render it in a vacuum condition; a stationary rod 6 is passed through the stationary end plate 2 and fixed to it, while a movable rod 7 is passed through the movable end plate 3 so as to be movable in its axial direction by means of an operating mechanism (not shown); a pair of electrodes 4, 5 are respectively attached to the opposed ends of the stationary and movable rods 6, 7 whereby the electrode 5 attached to the movable rod is connected to and disconnected from the electrode 4 depending on the movement of the movable rod 7. In this case, a bellows 8 is provided between the movable end plate 3 and the movable rod 7 so that the vacuum container is sealed in a vacuum condition and the movable rod 7 is permitted to move in its axial direction. A reference numeral 9 designates shielding members provided to surround the electrodes 4 and 5 and the stationary and movable rods 6 and 7.

Figure 2:
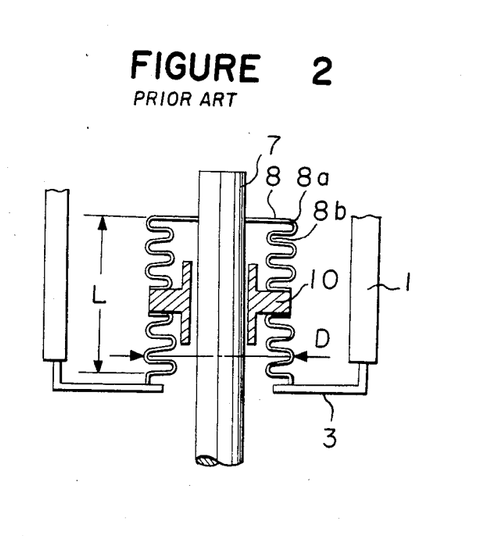
FIG. 2 is a cross-sectional view of a conventional long stroke type bellows.

There has so far been known to use a bellows device as shown in FIG. 2 which is an enlarged view of a part of the vacuum switch tube as in FIG. 1. In FIG. 2, the pressure container 1 contains a gas or a gas mixture subjected to pressure reduction to the extent of a high vacuum. The movable end plate 3 having an central opening is fixed to the lower end of the pressure container 1 and the movable rod 7 is passed through the central opening of the movable end plate 3 to be movable in its axial direction by means of the operating mechanism. There is provided the bellows 8 whose one end is firmly connected to the movable rod 7 and the other end is firmly connected to the movable end plate 3, the bellows being made of a thin-walled metallic tube and having a plurality of recesses 8b and ridges 8a in the direction of expansion and contraction. An intermediate fitting 10 is interposed at the middle portion of the bellows 8 whereby it can slide on the outer circumferential surface of the movable rod 7 when the rod 7 is caused to move in its axial direction.

There have been known a bellows valve, a vacuum switch and so on as a device which utilizes a bellows device to keep air-tightness of a container and to be capable of moving in its axial direction. In such devices, it is necessary to reduce stress for one ridge 8a of a bellows device so that the bellows device having a long stroke and being usable for a long term can be obtained. Accordingly, it necessarily requires a bellows device having a number of ridges 8a and as a result, a ratio of the length to the diameter of the bellows device generally exceeds 1.5. However, preparation of a bellows device having a large L/D ratio is very difficult. Accordingly, plural pieces of bellows have been connected in a multi-stage to obtain a desired performance.

Use of a bellows device is variable depending on circumstances such as gas or liquid used, pressure and so forth. Generally, a bellows device is operated by a pressure difference between the interior and the exterior of the bellows devices. In this case, when a bellows device having a large L/D ratio is used, there takes place deformation of the bellows 8 into a generally L-shape at the middle portion, in other words, there takes place so-called buckling phenomenon. To avoid such drawback, an intermediate fitting 10 is provided at a position susceptible to cause buckling phenomenon in the bellows 8.

Thus, the buckling phenomenon occurs in the bellows device having a large L/D ratio when a pressure difference takes place between the interior and the exterior of the bellows device. In this case, if the intermediate fitting 10 to prevent the buckling is not provided, there is excessive stress at a position in the bellows where buckling takes place. As a result, movement of the bellows device in the axial direction hinders a prolong term of use of it even though the number of ridges 8a is increased to reduce the amplitude of vibration per one ridge. Even when the intermediate fitting 10 is used to prevent the buckling, there is caused disadvantages such that deformation due to wearing takes place in the bellows device between the movable rod 7 and the intermediate fitting 10 for prevention of buckling or the movable rod 7 is shaved by the intermediate fitting 10 to hinder smooth movement of the movable rod 7 or to cause sticking due to friction. Further, when the movable rod 7 is operated quickly, there is delay in the movement of the intermediate fitting 10 for prevention of buckling at the time of initiation and stoppage of the movable rod 7 whereby an excessive force is applied to the bellows 8 thereby to shorten the life time of the device.

SUMMARY OF THE INVENTION

It is an object of the present invention to provide a bellows device which is of a long stroke; allows a long time use; is highly reliable and enables an increase in durability against buckling.

The foregoing and the other objects of the present invention have been attained by providing a bellows device comprising a plurality of recesses and ridges in the direction of expansion and contraction, characterized in that the thickness of the middle part in such direction is larger than that of the neighboring part.

BRIEF DESCRIPTION OF THE DRAWINGS

A more complete appreciation of the invention and many of the attendent advantages thereof will be readily obtained as the same becomes better understood by reference to the following detailed description when considered in connection with the accompanying drawings, wherein.

DESCRIPTION OF THE PREFERRED EMBODIMENTS

Figure 3:
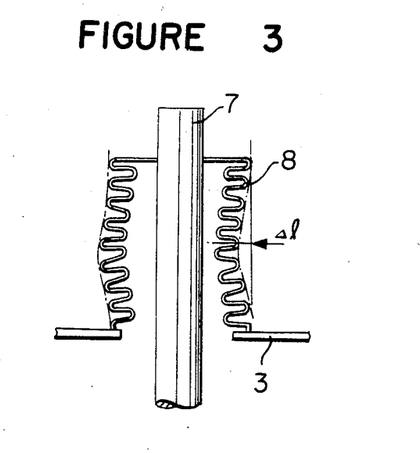
FIG. 3 is a diagram showing a bellows under a buckling condition.

In general, a buckling pressure P (i.e. a pressure to cause buckling in a bellows) of a bellows 8 without having an intermediate fitting 10 for prevention of buckling as shown in FIG. 3 is roughly calculated by an experimetal equation and such buckling pressure P is expressed by:

$$P = A \frac{n \cdot K}{L^2} \quad (1)$$

where A: a constant given by the inner and outer diameters and a pitch between adjacent ridges of a bellows, n: number of ridges, K: spring constant, L: natural length.

The natural length L and the spring constant K are functions of the number of ridges n in the equation (1) and the equation (1) can be replaced by:

$$P = A_1 \frac{1}{n^2} \quad (2)$$

In the equation (2), the buckling pressure P is inversely proportional to the square of the number of ridges n.

Figure 4:
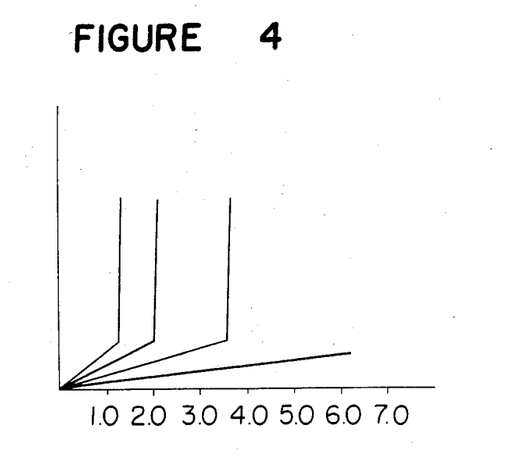
FIG. 4 is a diagram showing the relationship of pressure in a bellows to buckling quantity utilizing the number of ridges of the bellows as a parameter.

Tests have been carried out with use of a plurality of bellows having the same inner and outer diameters, a wall thickness and a pitch between adjacent ridges but having different number of ridges. A pressure device such as a compressor is used to apply a pressure in the bellows. Buckling quantity Δl as shown in FIG. 3 is changed by changing a pressure from the compressor. FIG. 4 shows variation of the buckling quantity Δl with respect to a pressure applied to the bellows. It has been found that buckling pressure varies depending on variation of the number of ridges. The tests further reveal that when the changing points of the buckling quantity are plotted in FIG. 5, the thus obtained curve matches with the curve given by the above-mentioned equation. It is clear that portions where the buckling takes place are concentrated to the middle portion of the bellows and therefore the middle portion of the bellows should be improved to prevent the buckling. To eliminate the buckling phenomenon, a bellows having a thick wall should be arranged at the middle portion of the bellows where the buckling takes places to increase rigidity of the middle portion to improve resist against buckling pressure.

Figure 6:
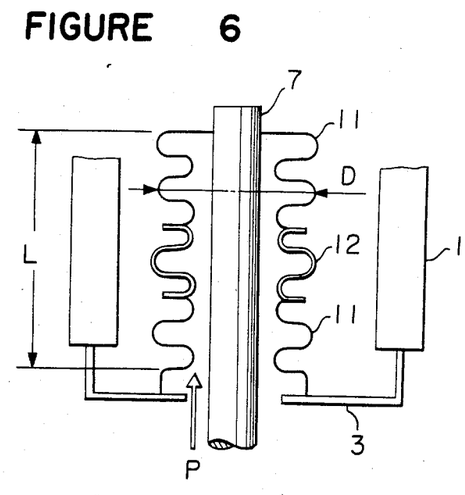
FIG. 6 is an enlarged cross-sectional view of an embodiment of the bellows device according to the present invention.
Figure 7:
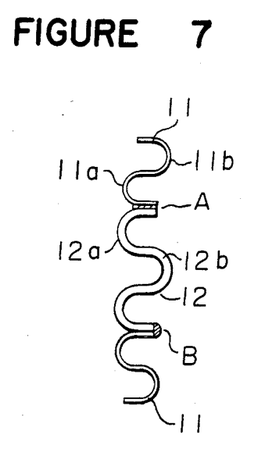
FIG. 7 is an enlarged cross-sectional view of a part of the bellows device shown in FIG. 6.

An embodiment of the bellows device according to the present invention will be described with reference to the drawings. In FIGS. 6 and 7, the same reference numerals designate the same or corresponding parts. The movable rod 7 is inserted in the container 1 through the lower end plate 3. Two thin-walled bellows 11 each having recesses 11a and a ridges 11b in the direction of expansion and contraction are arranged at both sides of a thick-walled bellows which has two recesses 12a and one ridge 12b in the direction of expansion and contraction. One end of the thin-walled bellows placed at the upper position is connected to the movable rod 7 and the outer end surface contiguous to the recess 11a at the other end side faces the outer end surface contiguous to the recess 12a of the thick-walled bellows 12 and is firmly connected thereto. Similarly, one end of the thin-walled bellows 11 at the lower position is connected to the movable end plate 3 and the other end is connected to the thick-walled bellows 12. Connection of the two bellows can be performed either by brazing method as shown by a letter A or by welding method as shown by a letter B. The thickness of the thin-walled bellows 11 is in the range from about 0.08 mm (when the diameter is 6 mm) to 0.23 mm (when the diameter is 150 mm).

Figure 8:
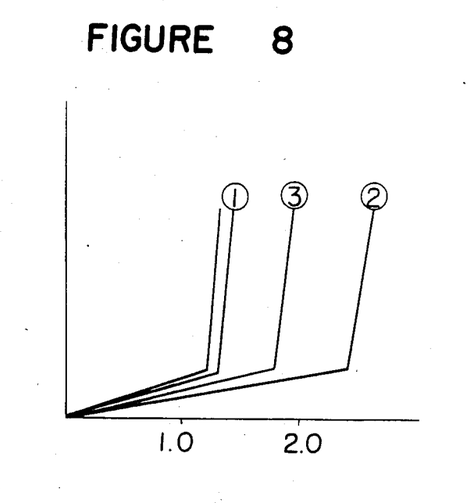
FIG. 8 is a diagram showing the relationship of a pressure applied to a bellows of an embodiment of the present invention to buckling quantity.

FIG. 8 is a diagram showing variation of an inner pressure versus buckling quantity of the bellows device according to the present invention. A curve on the most left-hand side in FIG. 8 represents performance of a bellows device having 24 ridges as a standard. A curve designated by a sample number (1) is performance of a bellows device having 24 ridges in which a piece of bellows having a wall thickness being 1.4 times as much as that of the other pieces of bellows is substituted for one ridge, for example, for the thirteenth ridge. The curve of the sample (1) shows slight increase of buckling pressure but a remarkable effect can not be obtained.

A curve designated by a sample number (2) is performance of a bellows device which has 24 ridges in which a piece of the bellows of the wall thickness which is 1.4 times as much as the other pieces of the bellows is substituted for three ridges at the middle portion of the bellows device, namely for the 12th, the 13th and the 14th ridges. The curve of the sample (2) shows increased buckling pressure which is 2 times as much as the standard bellows and an excellent effect can be obtained.

A curve designated by a sample number (3) indicates the performance of a bellows device which has the same structure as the sample (2) provided that the wall thickness of the bellows at the middle portion is 1.2 times as much as the ordinary bellows. It is comprehensible that a buckling pressure is much improved. In view of the test results, the wall thickness of the bellows at the middle portion should be 1.2 times or more than that of the other part and when the wall thickness is 1.4 times or more as much as that of other part, a buckling pressure is remarkably improved. For example, when the thickness of the thin-walled bellows 11 of substantially uniform thickness is 1 mm, the wall thickness of the thick-walled bellows 12 is 1.2 mm or more.

In the above-mentioned embodiment, the bellows device is of three stage connection and the adjacent bellows are directly connected in which a thick-walled bellows 12 is arranged at the middle portion. The same effect can be obtained by arranging a thick-walled bellows 12 at the middle portion in a bellows device having further multi-stage connections. When two bellows adjacent each other are to be connected, an intermediate fitting 13 may be interposed therebetween. In this case, a way of connection can be either by brazing (A) or by welding (B) as shown in FIG. 7.

Figure 9:
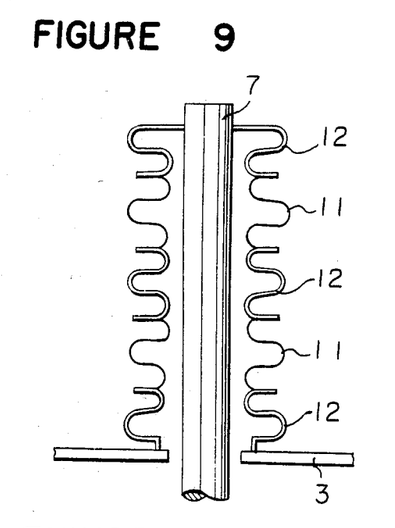
FIG. 9 is a schematic view of a five stage bellows device according to the present invention in which three bellows members having a large thickness are arranged at the intermediate part and the upper and lower end parts.
Figure 10:
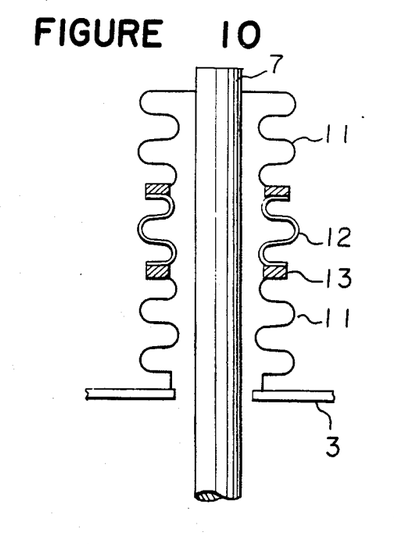
FIG. 10 is a schematic view of another embodiment of the present invention in which an intermediate fitting is interposed in a bellows.

Further effect can be obtained by arranging pieces of thick-walled bellows 12 at the middle portion and both ends of a bellows device formed of multiple connection of several bellows as shown in FIG. 9.

Figure 11:
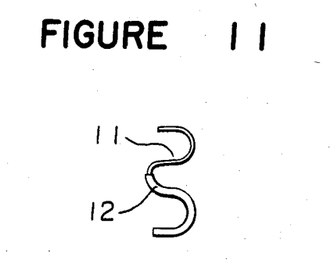
FIG. 11 is a cross-sectional view showing a method of connecting two bellows members according to a further embodiment of the present invention.

Further, the same effect as in the previously mentioned embodiments can be obtained even when a bellows device having recesses and ridges formed by inverting those of the bellows device shown in FIG. 6 is used. Connection of the thin-walled bellows and the thick-walled bellows is not limited to the ways as shown in FIG. 7 and it is possible to use a connecting method as shown in FIG. 11 although this method requires some accuracy for the preparation.

Figure 12:
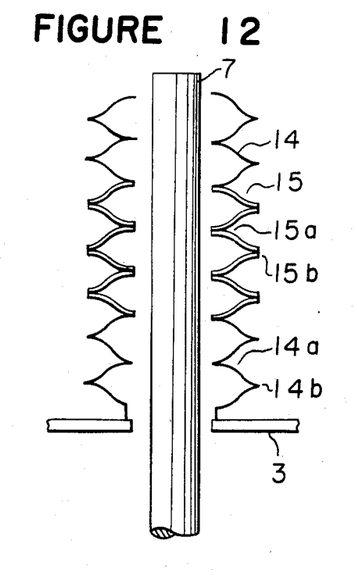
FIG. 12 is a cross-sectional view of still another embodiment of the bellows device according to the present invention.

In the embodiments as above-mentioned, a bellows device is prepared by using a continuous metallic tube without any cutting portion between the recesses and the ridges adjacent each other. However, it is possible to form a bellows device by alternately connecting each one end of a plurality of metallic tube pieces to form recesses 14a, 15a and ridges 14b, 15b as shown in FIG. 12 and the thickness of the middle portion 15 is made thicker than the thickness of the adjacent portions 14 to perform the same effect as the previously mentioned embodiments.

As described above, in accordance with the present invention, a buckling pressure can be increased by making the wall thickness of the middle part of a bellows device larger than that of the neighboring part, with the consequence that an intermediate fitting for prevention of buckling which has been required in the conventional bellows can be omitted and a bellows device of a long stroke type can be obtained with a long time use and reliability.

Obviously, numerous modifications and variations of the present invention are possible in light of the above teachings. It is therefore to be understood that within the scope of the appended claims, the invention may be practiced otherwise than as specifically described herein.

I claim:

1. A bellows device, comprising:
a plurality of bellows members having recesses and ridges formed therein in an axial direction of the expansion and contraction wherein the thickness of a bellows member in a middle axial portion of said device is larger than that of neighboring bellows members and wherein said neighboring bellows members are of uniform thickness.

2. The bellows device according to claim 1, wherein the thickness of said bellows member in said middle axial portion is at least 1.2 times the thickness of said neighboring bellows members.

3. The bellows device according to claim 2, wherein said middle axial portion of said device includes at least three ridges.

4. The bellows device according to claim 1, wherein an outer end surface contiguous to a recess of said neighboring bellows members is opposed to an outer end surface continguous to a recess of said bellows member in said middle axial portion.

5. The bellows device according to claim 4, further comprising an intermediate fitting for interconnecting said bellows member in said middle axial portion with said neighboring bellows members.

6. The bellows device according to claim 1, further comprising first and second end bellows members of a thickness corresponding to said bellows member in said middle axial portion, said first and second end bellows members being connected to said neighboring bellows members, respectively.

* * * * *

UNITED STATES PATENT AND TRADEMARK OFFICE
CERTIFICATE OF CORRECTION

PATENT NO. : 4,585,913

DATED : April 29, 1986

INVENTOR(S) : Mitsumasa Yorita

Figure 5:
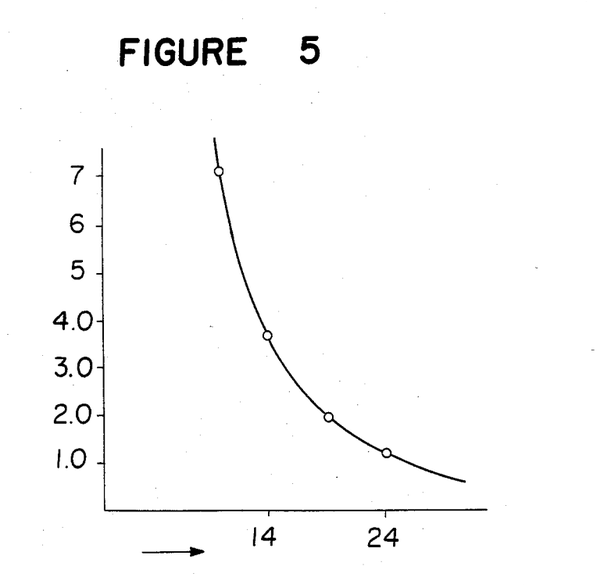
FIG. 5 is a diagram showing the relationship of the number of ridges of a bellows to a pressure at which buckling takes place.

It is certified that error appears in the above-identified patent and that said Letters Patent is hereby corrected as shown below:

Figures 4, 5, and 8 of the drawings should be deleted to appear to appear as per attached sheets.

Signed and Sealed this

Fifteenth Day of July 1986

[SEAL]

Attest:

Attesting Officer

DONALD J. QUIGG

Commissioner of Patents and Trademarks

UNITED STATES PATENT AND TRADEMARK OFFICE
CERTIFICATE OF CORRECTION

PATENT NO. : 4,585,913

DATED : April 29, 1986

INVENTOR(S) : Mitsumasa Yorita

It is certified that error appears in the above-identified patent and that said Letters Patent is hereby corrected as shown below:

Please amend drawing Figures 4, 5, and 8 as shown.

UNITED STATES PATENT AND TRADEMARK OFFICE
CERTIFICATE OF CORRECTION

PATENT NO. : 4,585,913
DATED : April 29, 1986
INVENTOR(S) : Mitsumasa Yorita

It is certified that error appears in the above-identified patent and that said Letters Patent is hereby corrected as shown below:

FIGURE 5

UNITED STATES PATENT AND TRADEMARK OFFICE
CERTIFICATE OF CORRECTION

PATENT NO. : 4,585,913

DATED : April 29, 1986

INVENTOR(S) : Mitsumasa Yorita

It is certified that error appears in the above-identified patent and that said Letters Patent is hereby corrected as shown below: